US009358829B2

(12) United States Patent
Iso

(10) Patent No.: US 9,358,829 B2
(45) Date of Patent: Jun. 7, 2016

(54) RULER

(71) Applicant: YUGEN-KAISYA TAPIRO, Okegawa-Shi, Saitama-Ken (JP)

(72) Inventor: Nobuaki Iso, Okegawa (JP)

(73) Assignee: YUGEN-KAISYA TAPIRO, Okegawa-Shi, Saitama-Ken (JP)

( * ) Notice: Subject to any disclaimer, the term of this patent is extended or adjusted under 35 U.S.C. 154(b) by 177 days.

(21) Appl. No.: 14/194,462

(22) Filed: Feb. 28, 2014

(65) Prior Publication Data

US 2014/0245624 A1 Sep. 4, 2014

(30) Foreign Application Priority Data

Mar. 4, 2013 (JP) ................................ 2013-041638

(51) Int. Cl.

*B43L 7/00* (2006.01)
*B62D 7/00* (2006.01)
*B62D 1/04* (2006.01)
*B26D 7/00* (2006.01)
*B26D 7/02* (2006.01)
*B26D 1/04* (2006.01)

(52) U.S. Cl.

CPC ............... *B43L 7/007* (2013.01); *B26D 7/0006* (2013.01); *B26D 7/025* (2013.01); *B26D 1/045* (2013.01)

(58) Field of Classification Search

CPC ............ B26D 1/04; B26D 1/045; B26D 7/00; B26D 7/0006; B26D 7/025; B43L 7/00; B43L 7/007; G01B 3/00; G01B 3/02; G01B 3/04

USPC ............ 33/403, 483, 484, 485, 489, 490, 493

See application file for complete search history.

(56) References Cited

U.S. PATENT DOCUMENTS

| | | | | | |
|---|---|---|---|---|---|
| 1,614,812 | A * | 1/1927 | Trane | B43L 7/00 | 30/366 |
| 2,771,679 | A * | 11/1956 | Cupp | G01B 3/04 | 33/490 |
| 6,314,653 | B1 * | 11/2001 | Iso | B43L 7/00 | 33/484 |
| 7,503,124 | B2 * | 3/2009 | Hobden | G01C 9/02 | 33/451 |
| 7,621,056 | B2 * | 11/2009 | Iso | B43L 7/00 | 33/483 |
| 7,958,646 | B2 * | 6/2011 | So | B43L 7/005 | 33/484 |
| 2002/0095804 | A1 * | 7/2002 | Coplan | B25H 1/0078 | 33/484 |

FOREIGN PATENT DOCUMENTS

| | | | | |
|---|---|---|---|---|
| FR | 2572682 | A1 * | 5/1986 | B43L 7/00 |
| JP | 4278207 | | 6/2009 | |
| JP | 4384764 | | 12/2009 | |
| JP | 5137328 | | 2/2013 | |
| JP | 2015150714 | A * | 8/2015 | B43L 7/00 |

* cited by examiner

*Primary Examiner* — R. A. Smith
(74) *Attorney, Agent, or Firm* — Holtz, Holtz & Volek PC

(57) ABSTRACT

A ruler having an arch member on an upper surface of a ruler body for allowing the ruler body to closely contact a target object by being pressed from above. The ruler has a pair of parallel standing walls facing each other on the upper surface of the ruler body in a longitudinal direction, and the arch member is fitted along the longitudinal direction of the standing walls. In addition, bending pieces which bend inward towards each other are formed on upper end edges of the standing walls, projections which are positioned below the bending pieces project on both of outer side surfaces of the arch member, and the projections are guided by the bending pieces and are inserted between the standing walls.

16 Claims, 8 Drawing Sheets

RULER

BACKGROUND OF THE INVENTION

1. Field of the Invention

The present invention relates to a ruler, and particularly relates to improvement of a ruler having an arch member to be pressed on an upper surface of a ruler body for allowing side edges of the ruler body to closely contact on a surface of a target object.

2. Description of Related Art

Applicants and inventors of the present case heretofore have filed patent applications concerning a ruler with good work efficiency to be a guide for drawing a line or performing cutting by using a cutter by closely abutting on a target object, and three applications have matured into patents. A factor playing a central role in respective rules is that an arch member for giving a force of allowing the ruler to closely contact the surface of the target object is provided on an upper portion of the ruler body, and the contents of the technique are disclosed in Japanese Patent No. 4278207 (Patent Document 1), Japanese Patent No. 4384764 (Patent Document 2) and Japanese Patent No. 5137328 (Patent Document 3).

However, the high accuracy is pursued in the structure of the ruler in related-art examples, in which the arch member is supported by ribs (standing walls) of the ruler body by using pivot shafts, therefore, operations of adjusting a pitch and specifying a position are complicated, and further, the yield is low and the structure may not be suitable for mass production, which is a factor that increases costs.

When the ruler body and the arch member are formed by using different materials respectively, it is difficult to assemble them due to the difference in expansion coefficients, contraction coefficients and the like, and further, the selection of materials becomes uniform.

SUMMARY OF THE INVENTION

A problem to be solved by the present invention is a point that there has been no ruler having the arch member on the upper surface as in related art, which is suitable for mass production to reduce the price and can be formed by using different materials for the ruler body and the arch member, and in which there is no backlash and edges for operations of the ruler body closely contact the surface of the target object so as not to move.

In order to solve the above problem, there is provided a ruler having an arch member on an upper surface of a ruler body for allowing the ruler body to closely contact a target object by being pressed from above, which includes a pair of parallel standing walls facing each other on the upper surface of the ruler body along the longitudinal direction, in which the arch member is fitted along the longitudinal direction of the standing walls. In the ruler, bending pieces bending inward to each other may be formed on upper end edges of the standing walls, projections positioned below the bending pieces may project on both outer side surfaces of the arch member, and the projections maybe guided by the bending pieces to be inserted between standing walls. Also in the ruler, spaces allowing vertical movement of the projections may be formed below the bending pieces.

Also in the ruler according to the embodiment of the present invention, fall-off stopper members for the arch member may be provided at openings of both end portions between the standing walls. Also in the ruler, at least one of the fall-off stopper members may have an elastically repelling structure having cushioning characteristics of absorbing deformation by pressing of the arch member.

Furthermore, in the ruler according to the embodiment of the present invention, a curved plate spring member having a top face portion a cross section of which is a half-arc shape and which abuts on the underside of the arch member may be provided in one or plural positions at arbitrary intervals to thereby press abutting portions extending to the entire length of the ruler body to closely contact a surface of the target object. Also in the ruler, the curved plate spring member may be fixed to the upper surface of the ruler body so that one side is free so as to slide. Also in the ruler, a bar may be provided at a free end portion in the curved plate spring member, and an end portion of the bar may be fitted into slits formed in a lower part of the standing walls. Also in the ruler, an anti-slip member may be formed below the top face of the curved plate spring member, which protrudes outward from a through hole provided in the ruler body when the arch member is pressed. Also in the ruler, supporting springs for preventing backlash which abut on inner wall surfaces of the standing walls may be provided in side edges of the curved plate spring member.

Moreover, in the ruler according to the embodiment of the present invention, a wave-shaped plate spring in which an enveloping portion for a screw preventing fall-off of the projection is formed at one end may be interposed between the standing wall and the arch member to thereby prevent backlash. Also in the ruler, a pair of protruding ridges for preventing deformation having a lower size than the height of surfaces on both sides which abut on a target object to thereby keep spaces with respect to a target surface may be formed on the back side of the ruler body in the longitudinal direction of the ruler body.

The ruler according to the embodiment of the present invention has the above structure. Accordingly, when the arch member is assembled to the ruler body, any particular positioning of pivot shafts is not necessary, and the arch member can be fitted in a sliding manner easily even when using different materials. The backlash can be eliminated by some factors for preventing backlash, edges for operations of the ruler body can be closely fixed to the surface of the target object due to a supporting force and a reaction force of the arch member by the curved plate spring member. As high precision is not particularly required, the arch member and the ruler body with the necessary length, width and thickness can be obtained freely by extrusion molding of plastic materials, which is suitable to commercial mass production and can reduce the price.

DESCRIPTION OF EMBODIMENTS

Figure 1:
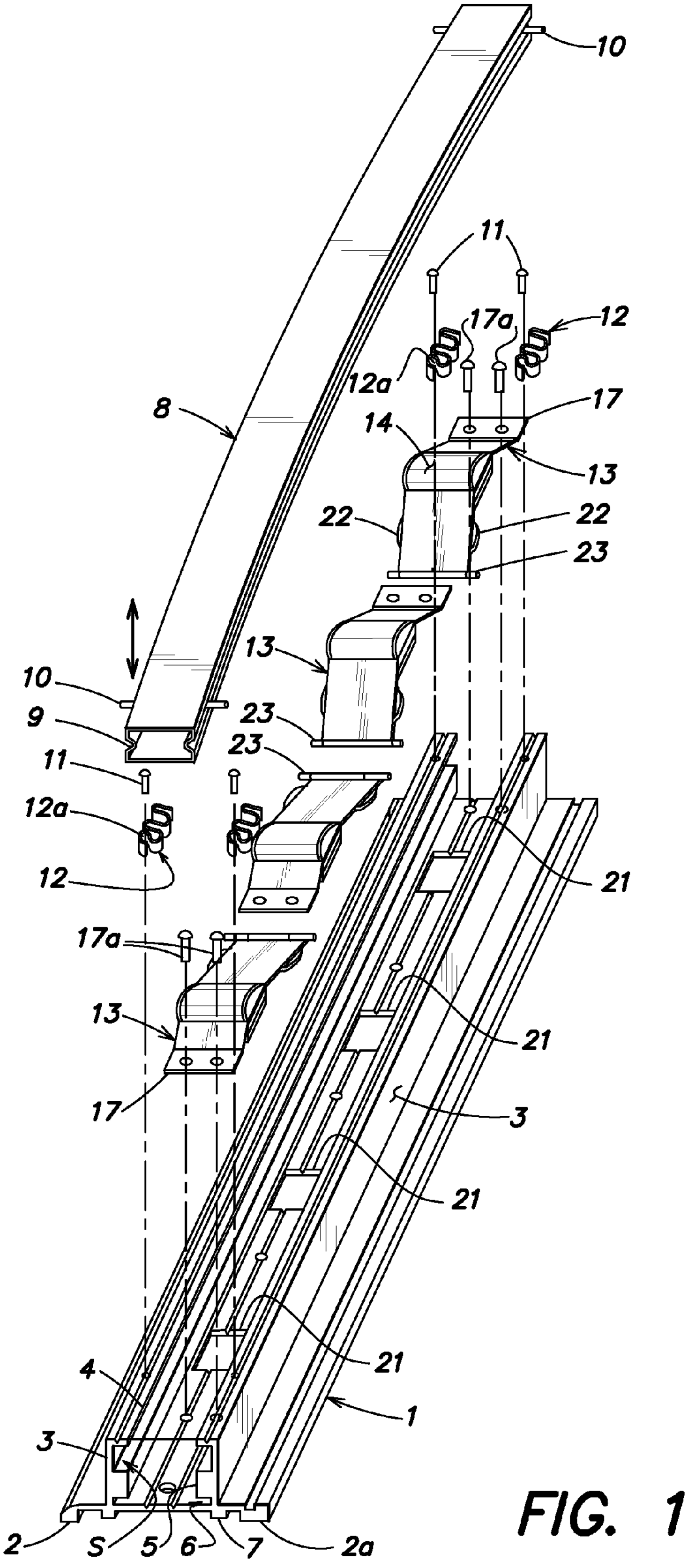
FIG. 1 is an exploded perspective view of a ruler according to the present invention.
Figure 2:
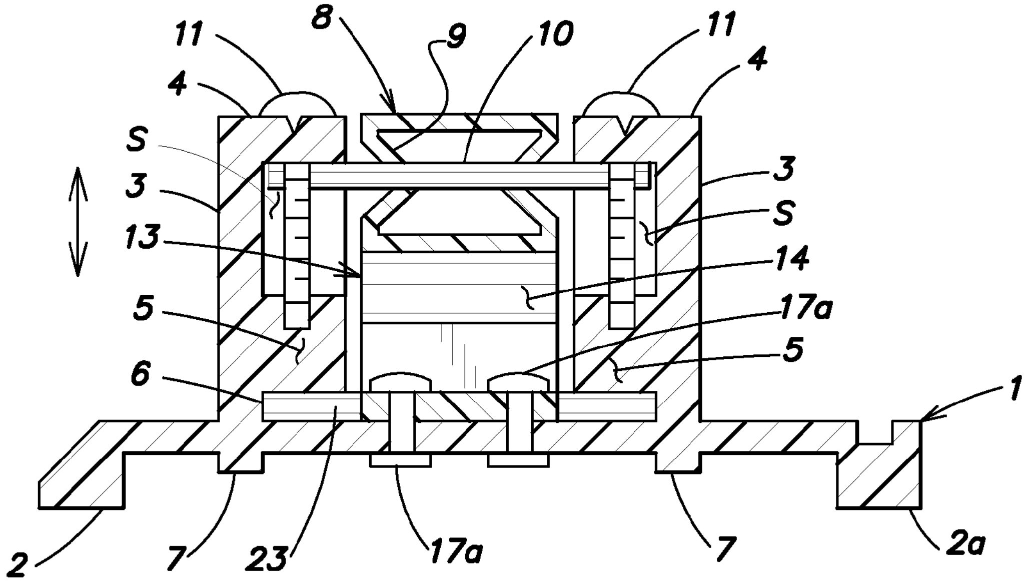
FIG. 2 is a partial vertical cross-sectional view at the time of assembling.
Figure 3:
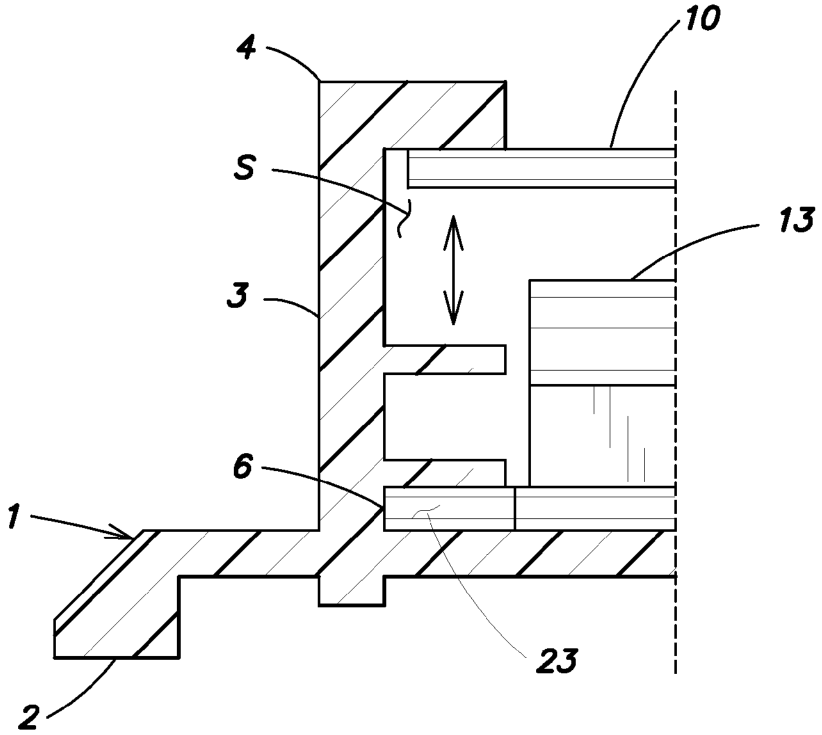
FIG. 3 is a partial enlarged view.
Figure 4:
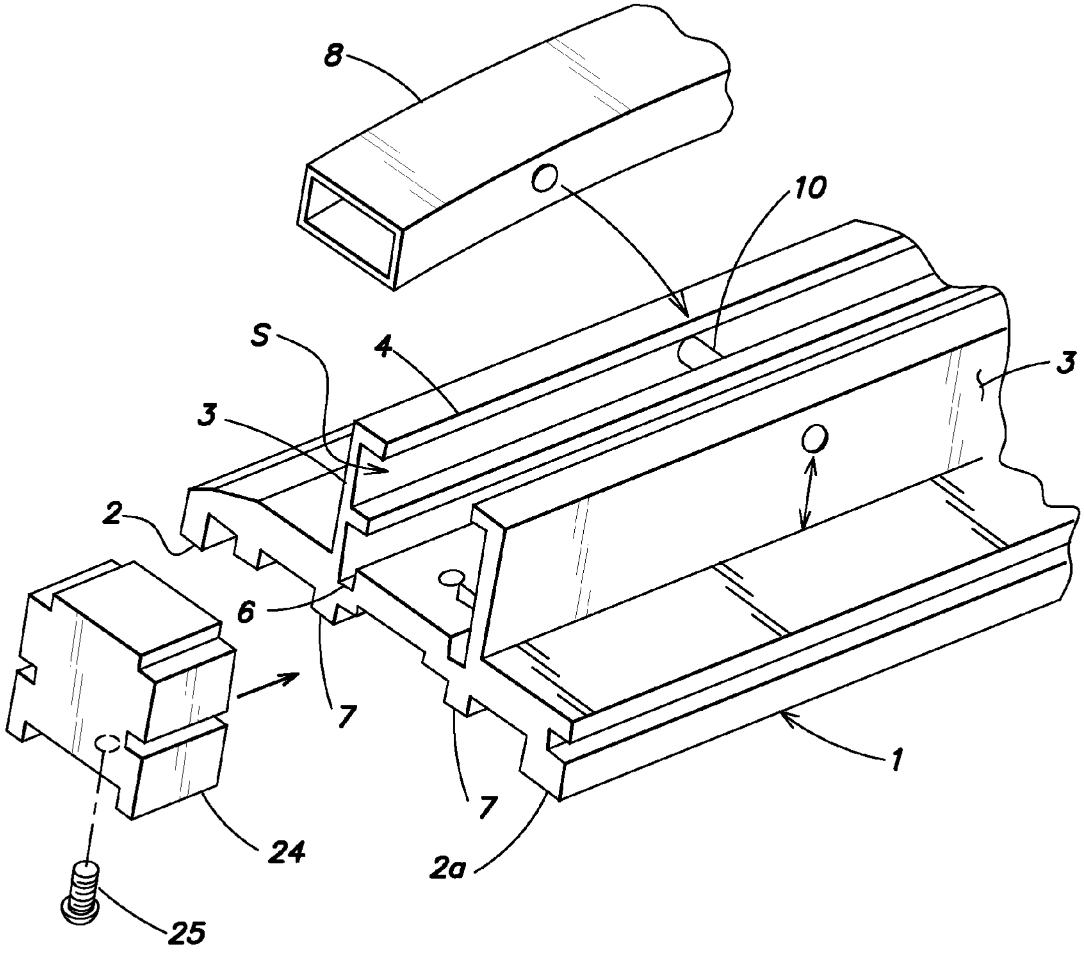
FIG. 4 is a partial perspective view showing a structure for preventing an arch member from falling off.
Figure 5:
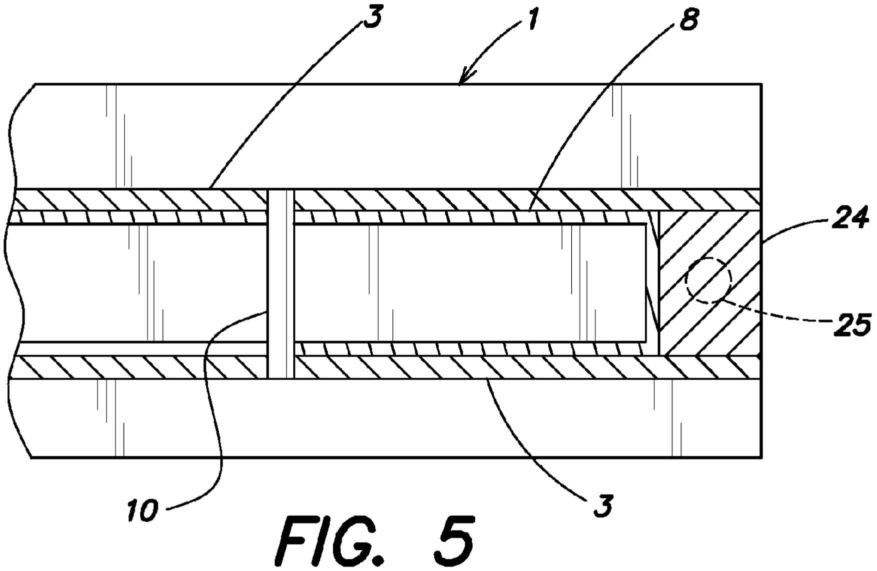
FIG. 5 is a plan view.

The present invention has been made as shown in the drawings and as explained in an embodiment.

[Embodiment 1]

Next, a preferred embodiment of the present invention will be explained with reference to the drawings. A numeral 1 in the drawings denotes a ruler body made of plastic and obtained by extrusion molding. In the ruler body 1, undersurfaces of both edges along the longitudinal direction are abutting portions 2, 2*a* with respect to paper or cloth as a target, and a cutter guide made of metal may be attached if necessary on the abutting portion 2 in which a tapered surface is formed.

On an upper surface of the ruler body 1, a pair of standing walls 3, 3 facing each other along the longitudinal direction is integrally formed. On upper end edges of the standing walls 3, 3, bending pieces 4, 4 respectively bending inward at right angles are integrally formed, and spaces S allowing movement of projections provided on both outer side surfaces of a later-described arch member are formed between the bending pieces 4, 4 and wall thickness portions 5, 5 provided at portions close to lower ends of the standing walls 3, 3. Then, slits 6, 6 for preventing a later-described curved plate spring member from falling off are formed at lower parts of the wall thickness portions 5, 5. Moreover, on the undersurface of the ruler body 1, a pair of protruding ridges 7, 7 is integrally formed in parallel to the standing walls 3, 3 at positions just under the standing walls 3, 3. The height of the protruding ridges 7, 7 is lower than the abutting portions 2, 2*a*, therefore, a gap is made between the undersurface and the surface of the target object, which prevent deformation and damage of the ruler body 1 when a load is applied to the ruler body 1. That is, when the load is applied from the above, the protruding ridges 7, 7 which have been floated first touch the ground to receive the load, which prevent deformation and damage.

On the other hand, a numeral 8 in the drawings denotes the arch member. The arch member has an approximately square tubular shape, in which grooves 9, 9 having a V-shape in cross section are formed on approximately the center of both side surfaces along the longitudinal direction. In the embodiment, shafts 10, 10 are provided at end portions in the longitudinal direction so as to pierce the grooves 9, 9, and end portions of the shafts 10, 10 project outward from side surfaces of the arch member 8 to form projections.

The arch member 8 to which the shafts 10, 10 are attached is assembled by being fitted between the standing walls 3, 3 so that projecting ends of the shafts 10, 10 slide along the bending pieces 4, 4 of the standing walls 3, 3. Moreover, screws 11, 11 . . . for preventing the projecting ends of the shafts 10, 10 from falling off are attached to end portions along the longitudinal direction of the standing walls 3, 3 so as to pierce the spaces S from the bending pieces 4, 4 of the standing walls 3, 3 to the wall thickness portions 5, 5.

In the above-described spaces S, wave-shaped plate springs 12 for preventing and absorbing backlash are interposed between the projecting portions of the shafts 10 and the screws 11. In each of the wave-shaped plate springs 12, an enveloping portion 12*a* for enveloping the screw 11 is formed at one end thereof. As the plate spring 12 holds the screw 11 by the enveloping portion 12*a* and abuts on the projecting portion of the shaft 10 by the other end side to elastically repel the shaft 10, the movement of the shafts 10 is restricted while being allowed by cushioning characteristics, thereby preventing and absorbing backlash of the shafts 10 in the spaces S.

Furthermore, one or more curved plate spring members 13, 13 . . . are attached below the arch member 8 between the arch member 8 and the ruler body 1. In each of the curved plate spring member 13, a top face 14 contacting an undersurface of the arch member 8 in a sliding manner has a half-arc shape in cross section and formed by using plastic, wood and the like having high smoothness, though a spring body 15 itself is made of metal such as stainless steel. The top face 14 is installed between semicircle plates 16, 16 for preventing warpage. The curved plate spring members 13, 13 . . . can be attached at arbitrary intervals in accordance with the length of the ruler, that is, at necessary positions freely in a pinpoint manner. As the curved plate spring members 13, 13 . . . exist, the abutting portions 2, 2*a* of the ruler body 1 are pressed on and closely contact the surface of the target object over the entire length, therefore, a cutting operation by a cutter can be executed without wrinkling the target object even when the target object is, particularly, soft cloth, leather and so on.

Additionally, in the curved plate spring member 13, only one end 17 is fixed on the upper surface of the ruler body 1 by rivets 17*a*, 17*a*, and the other end is a free end which can slide. The one end to be fixed is positioned on the end portion side in the longitudinal direction of the ruler body 1, and when the top face 14 is pressed by the arch member 8, the curved plate spring member 13 descends downward due to the structure of the half-arc shape of the top face 14 and the sliding of the free end by allowing the curved plate spring member 13 to slide in the central direction where a gap between the ruler body 1 and the arch member 8 is larger.

The curved plate spring member 13 is provided by attaching an anti-slip member 19 through a holding plate 18 which is screwed to an undersurface of the top face 14 from below. The anti-slip members 19 protrude from through holes 21, 21 piercing through the ruler body 1 in conjunction with the top faces 14 of the curved plate spring members 13 descending by the pressing of the arch member 8, thereby abutting on the surface of the target object to prevent positional shift of the ruler body 1. A numeral 20 denotes a through hole to be made for adjustment when the spring body 15 is hard.

Furthermore, supporting springs 22, 22 preventing backlash are respectively provided in side edges on the free end side of the curved plate spring member 13. The support springs 22, 22 are formed in an arch shape, abutting on lower inner surfaces of the standing walls 3, 3, which are positioned by pushing inner surfaces due to the elastically repelling force to thereby prevent backlash.

In an end portion of the free end side of the curved plate spring member 13, a bar 23 for preventing the curved plate spring member 13 from falling off is provided. It is possible to prevent the curved plate spring member 13 from falling off from the ruler body 1 by fitting the end of the bar 23 into the slits 6, 6 provided in the lower part of the wall thickness portions 5, 5.

Figure 14:
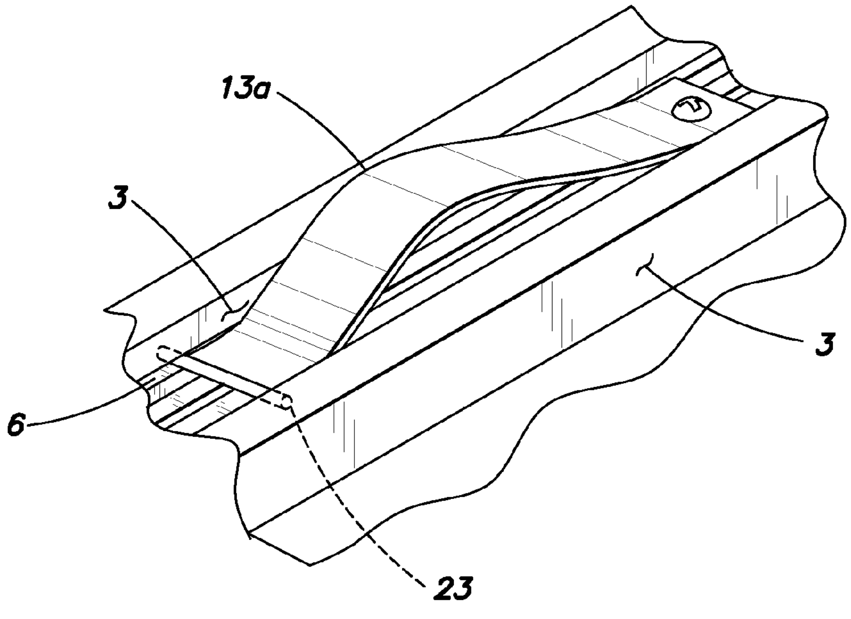
FIG. 14 is a view using another curved spring member.

The above-described curved plate spring member 13 can be also realized as a simple one-piece member as shown by a numeral 13*a* in FIG. 14. This case can be applied to a ruler in which the protrusion of the anti-slip member 19 is not an inevitable factor, that is, the ruler having a relatively short size.

Then, a stopper member 24 for preventing fall-off of the arch member 8 and fixing the arch member 8 is fastened to be fixed at a portion between end portions of the standing walls 3, 3 of the ruler body 1 in the longitudinal direction by a screw 25 from the underside of the ruler body 1. In the stopper 24, notches, projections and so on are formed on side surfaces thereof so as to correspond to grooves and so on formed on inner wall surfaces of the standing walls 3, 3 to perform sealing.

Figure 6:
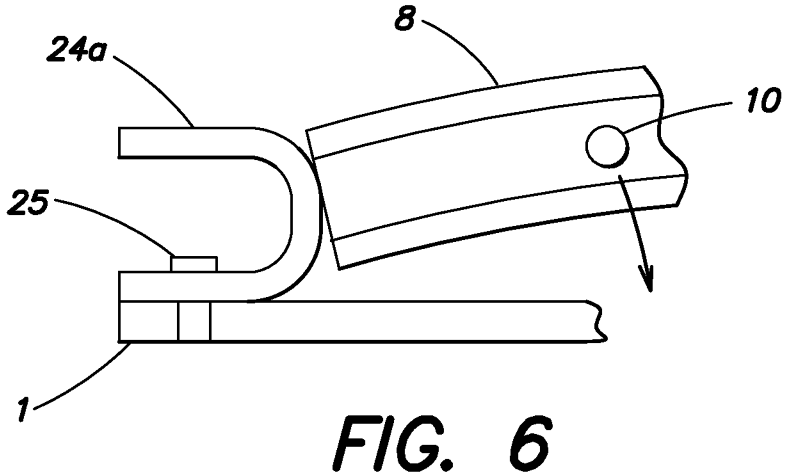
FIG. 6 is a view showing an elastically-repelling member at an end portion of the arch member.
Figure 7:
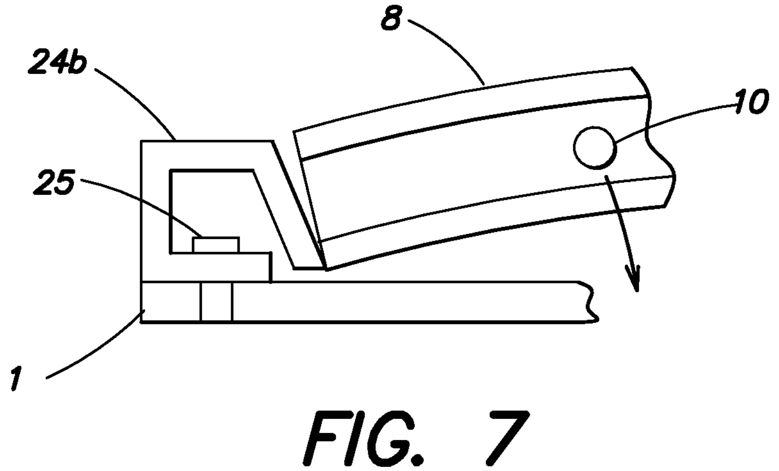
FIG. 7 is a view showing a modification example.
Figure 8:
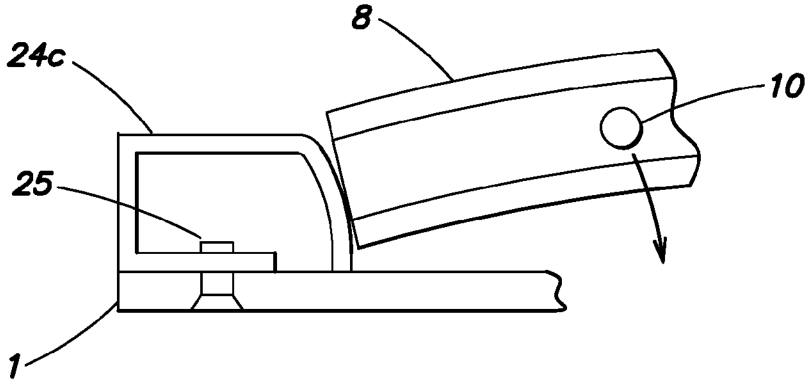
FIG. 8 is a view showing a second modification example.
Figure 9:
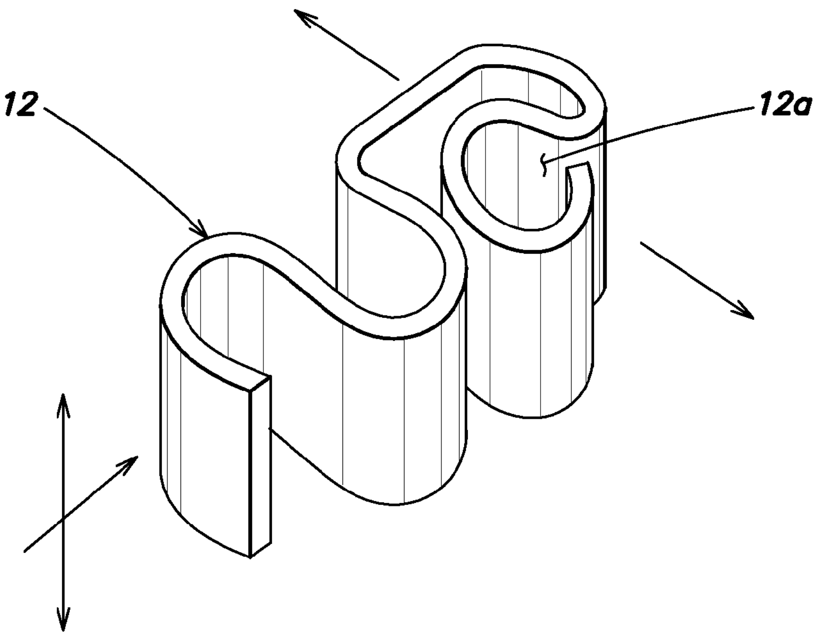
FIG. 9 is a view showing a wave-shaped plate spring for preventing backlash.
Figure 10:
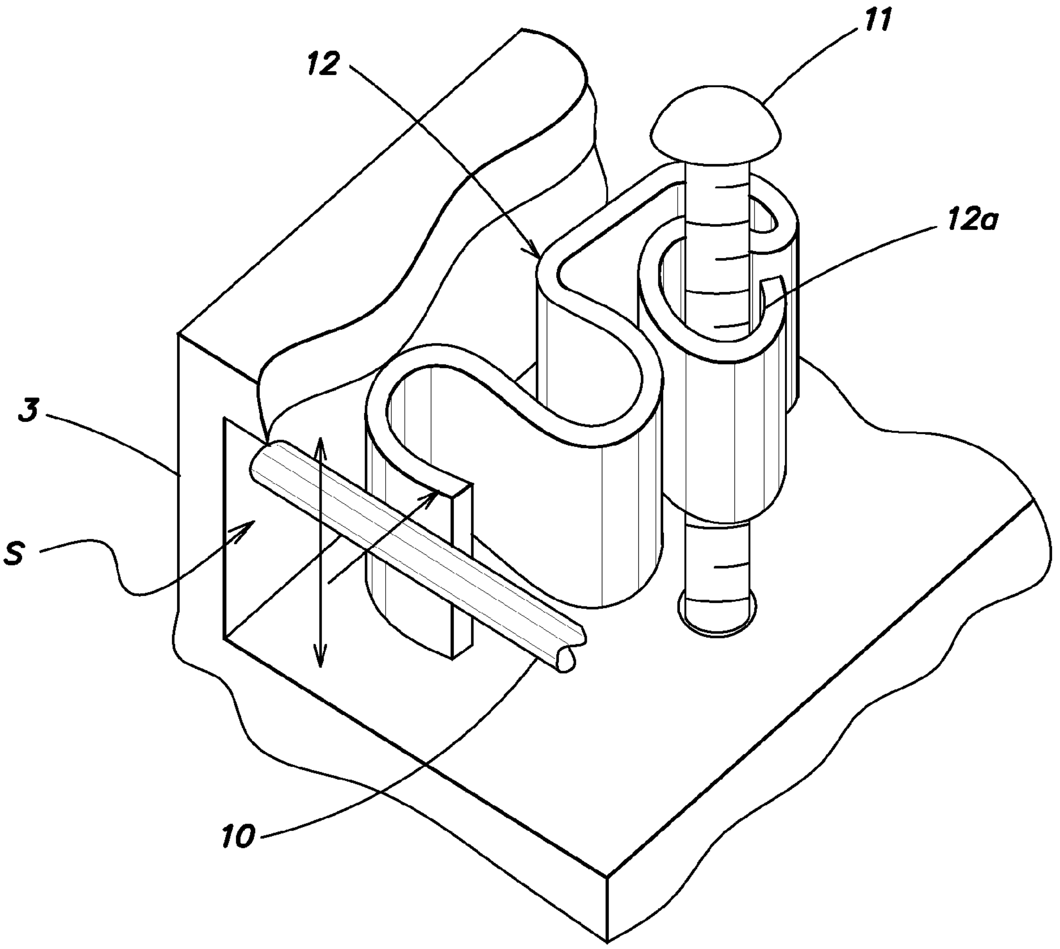
FIG. 10 is a view showing a use state.
Figure 11:
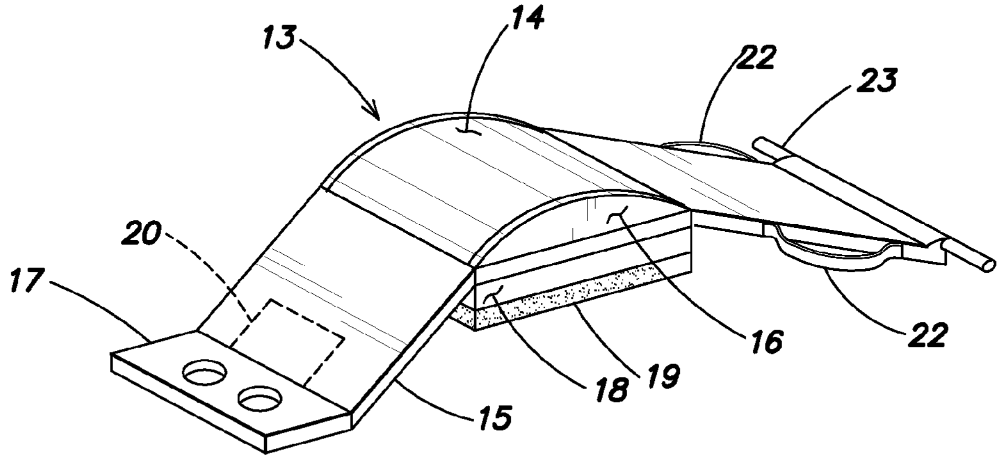
FIG. 11 is a view showing a curved spring member.
Figure 12:
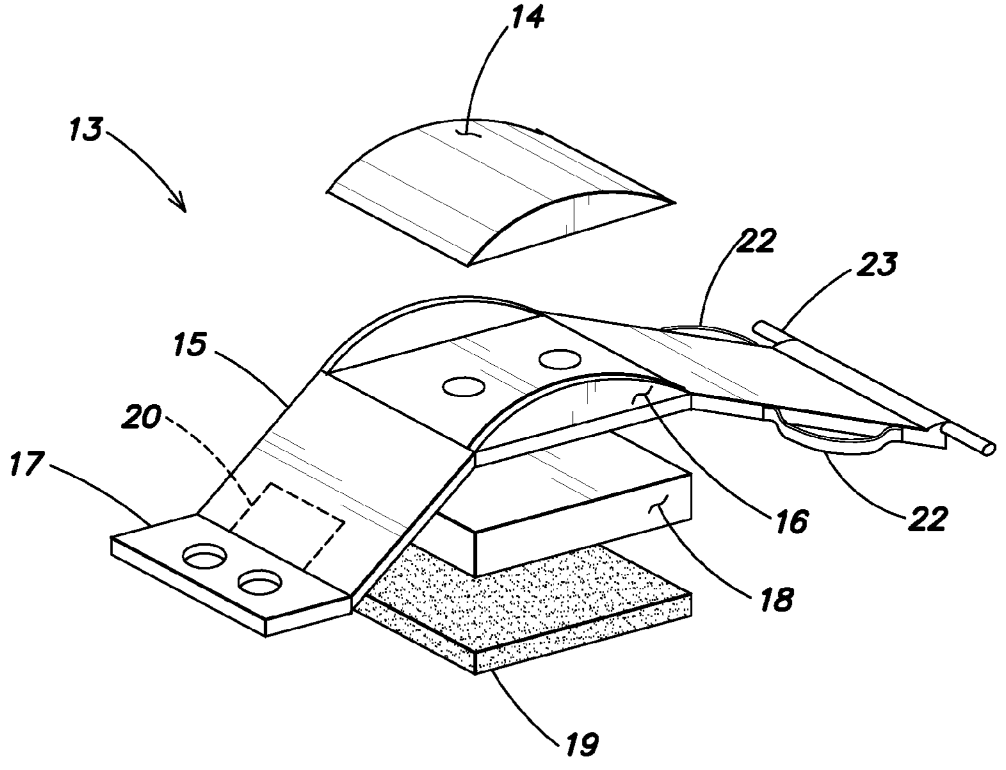
FIG. 12 is a view showing a modification example.
Figure 13:
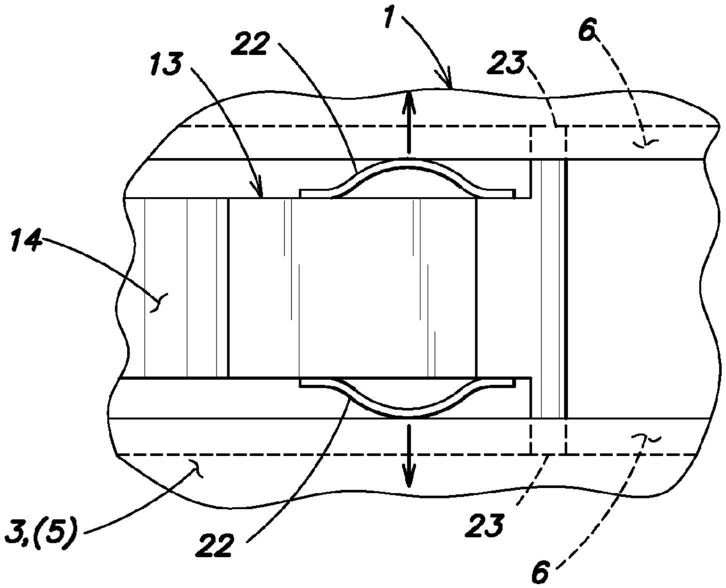
FIG. 13 is a view showing a use state of support springs.

Stopper members having structures shown in FIG. 6 to FIG. 8 may be used on one side. A stopper member 24*a* shown in FIG. 6 is a springy member formed in a bending U-shape, in which an end portion of the arch member 8 abuts on the bending portion, having an effect of absorbing deformation in the longitudinal direction by the pressing pressure of the arch member 8. A stopper member 24*b* shown in FIG. 7 is a springy member bending in a trapezoidal shape, in which part thereof opens, and the opened surface receives an abutting pressure at the end portion of the arch member 8 and absorbs deformation. Furthermore, a stopper member 24*c* shown in FIG. 8 is a springy member which is opened by forming an abutting surface with respect to the end portion of the arch member 8 in an R-shape and also absorbs deformation of the arch member 8.

The ruler according to the embodiment has the above structure. Though the arch member 8 has the square tubular shape in the embodiment, the shape is not limited to this and may be a flat-plate shape. The structure of the shaft 10 is not limited to the above, and it is sufficient that the protrusions are formed on both side surfaces of the arch member 8. Furthermore, the curved plate spring member 13 may be attached to the back side of the arch member 8 so that the top face 14 contacts the ruler body 1 in a sliding manner.

What is claimed is:

1. A ruler having an arch member on an upper surface of a ruler body for allowing the ruler body to closely contact a target object by being pressed from above, comprising:

a pair of parallel standing walls facing each other on the upper surface of the ruler body along a longitudinal direction, wherein the arch member is fitted along the longitudinal direction of the standing walls, wherein fall-off stopper members for the arch member are provided at openings of both end portions between the standing walls.

2. The ruler according to claim 1, wherein:

bending pieces bending inward towards each other are formed on upper end edges of the standing walls;

projections positioned below the bending pieces project on both outer side surfaces of the arch member; and the projections are guided by the bending pieces and are inserted between the standing walls.

3. The ruler according to claim 2, wherein:

spaces allowing vertical movement of the projections are formed below the bending pieces.

4. The ruler according to claim 3, wherein:

at least one of the fall-off stopper members has an elastically repelling structure having cushioning characteristics of absorbing deformation by pressing of the arch member.

5. The ruler according to claim 3, wherein:

a curved plate spring member having a top face portion a cross section of which is a half-arc shape and which abuts on an underside of the arch member is provided in one or plural positions at arbitrary intervals to thereby press abutting portions extending to an entire length of the ruler body to closely contact a surface of the target object.

6. The ruler according to claim 2, wherein:

at least one of the fall-off stopper members has an elastically repelling structure having cushioning characteristics of absorbing deformation by pressing of the arch member.

7. The ruler according to claim 2, wherein:

a curved plate spring member having a top face portion a cross section of which is a half-arc shape and which abuts on an underside of the arch member is provided in one or plural positions at arbitrary intervals to thereby press abutting portions extending to an entire length of the ruler body to closely contact a surface of the target object.

8. The ruler according to claim 1, wherein:

at least one of the fall-off stopper members has an elastically repelling structure having cushioning characteristics of absorbing deformation by pressing of the arch member.

9. The ruler according to claim 8, wherein:

a curved plate spring member having a top face portion a cross section of which is a half-arc shape and which abuts on an underside of the arch member is provided in one or plural positions at arbitrary intervals to thereby press abutting portions extending to an entire length of the ruler body to closely contact a surface of the target object.

10. The ruler according to claim 1, wherein:

a pair of protruding ridges for preventing deformation having lower sizes than heights of surfaces on both sides which abut on a target object to thereby keep spaces with respect to a target surface is formed on a back side of the ruler body in the longitudinal direction of the ruler body.

11. A ruler having an arch member on an upper surface of a ruler body for allowing the ruler body to closely contact a target object by being pressed from above, comprising:

a pair of parallel standing walls facing each other on the upper surface of the ruler body along a longitudinal direction, wherein the arch member is fitted along the longitudinal direction of the standing walls, wherein a curved plate spring member having a top face portion a cross section of which is a half-arc shape and which abuts on an underside of the arch member is provided in one or plural positions at arbitrary intervals to thereby press abutting portions extending to an entire length of the ruler body to closely contact a surface of the target object.

12. The ruler according to claim 11, wherein:

the curved plate spring member is fixed to the upper surface of the ruler body so that one side is free to slide.

13. The ruler according to claim 11, wherein:

a bar is provided at a free end portion in the curved plate spring member, and an end portion of the bar is fitted into slits formed in a lower part of the standing walls.

14. The ruler according to claim 11, wherein:

an anti-slip member is formed below a top face of the curved plate spring member, which protrudes outward from a through hole provided in the ruler body when the arch member is pressed.

15. The ruler according to claim 11, wherein:

supporting springs for preventing backlash which abut on inner wall surfaces of the standing walls are provided in side edges of the curved plate spring member.

16. A ruler having an arch member on an upper surface of a ruler body for allowing the ruler body to closely contact a target object by being pressed from above, comprising:

a pair of parallel standing walls facing each other on the upper surface of the ruler body along a longitudinal direction, wherein the arch member is fitted along the longitudinal direction of the standing walls, wherein a plate spring, in which an enveloping portion for a screw preventing fall-off of the projection is formed at one end, is interposed between each of the standing walls and the arch member to thereby prevent backlash.

* * * * *